United States Patent [19]
Callanan

[11] 3,759,505
[45] Sept. 18, 1973

[54] MOUNTING JIG FOR ELECTRICAL OUTLET BOXES

[76] Inventor: Joseph R. Callanan, 382 Homeland Dr., Whitman, Mass.

[22] Filed: Nov. 25, 1970

[21] Appl. No.: 92,871

Related U.S. Application Data

[62] Division of Ser. No. 772,566, Nov. 1, 1968, Pat. No. 3,588,084.

[52] U.S. Cl. .................. 269/98, 24/73 B, 211/71, 269/254 R
[51] Int. Cl. ............................................. B25b 5/14
[58] Field of Search ............... 269/95, 98, 254 R; 220/3 L–3.9 L; 24/261 WL, 738; 211/71–73, 45, 89, 106, 181

[56] References Cited
UNITED STATES PATENTS

| 381,608 | 4/1888 | Beisonhert | 269/98 X |
| 3,588,083 | 6/1971 | Callanan | 269/98 |
| 1,047,794 | 12/1912 | Griner | 269/98 |
| 1,049,803 | 1/1913 | Boyer | 269/98 |
| 3,434,686 | 3/1969 | Aoi | 269/254 R |
| 2,155,627 | 4/1939 | Welch | 220/3.6 |

Primary Examiner—Harold D. Whitehead
Assistant Examiner—E. F. Desmond
Attorney—Curtis, Morris & Safford

[57] ABSTRACT

A jig for mounting electrical outlet boxes to building wall and ceiling members having a three sided open loop section adapted to grasp a wall of an outlet box, an alignment arm section extending from the loop section to align the box and jig on a building member, and a leg member section extending from adjacent the arm section to hold the jig and box on a building member.

9 Claims, 11 Drawing Figures

PATENTED SEP 18 1973 3,759,505

MOUNTING JIG FOR ELECTRICAL OUTLET BOXES

This application is a division of my copending application Ser. No. 772,566 filed Nov. 1, 1968, now U.S. Pat. No. 3,588,084 issued June 28, 1971.

This invention relates to a device for mounting electrical outlet boxes, and more particularly to a sturdy, inexpensive, one-piece or two-piece re-usable jig that quickly and easily can be slipped onto an electrical outlet box with which it can be mounted on a stud or joist of a building under construction to align the box accurately for securing the box to the stud or joist, and then readily can be removed from the box and building member.

Outlet boxes ordinarily are mounted in new buildings, for example houses, on wall studs or ceiling joists over which a lath and plaster or a dry-wall construction is placed to form the interior walls or ceilings. The open end of the box, into which later is placed a fixture, receptacle or switch, must extend outwardly from the stud or joist an amount about equal to the wall or ceiling thickness so that the exposed portion of the box will be flush with the wall or ceiling. Also, the box must be aligned vertically or horizontally so the edges of the opening project an equal distance from the front face of the stud.

Hand mounting of electrical boxes is difficult and time consuming because at least one hand must be used to hold the box as it is secured, e.g., by nails, to the stud or joist. The box often slips, or inadvertently is moved by the worker's hand, and is misaligned. A house might have as many as 20 or more electrical outlets, so that the time involved properly to hand mount the outlet boxes, and to re-mount misaligned ones, is considerable.

Numerous devices have been created to align or to hold and align electrical outlet boxes as they are secured to building members. Many such devices have been patented, for example, in U.S. Pat. No. 2,802,634, No. 2,990,172 and No. 3,154,304. In general, however, the previous devices have serious shortcomings. Some are permanently affixed to the box, stud or joist, and thus are not re-usable. Others are of relatively complex construction, having a multiplicity of parts many of which are movable, and thus both expensive to make and very subject to wear and breakage.

It is an object of this invention to provide an improved mounting jig for electrical outlet boxes. Another object of this invention is to provide an outlet box mounting jig that is readily attached to the box, simple to place on a building member, accurately and positively aligns and holds the box against a stud or joist, and is easily removed from both the box and building member for re-use, all in a comparatively short amount of time. A further object of this invention is to provide a jig of the type described that has a relatively simple design and unitary construction or without a multiplicity of parts, particularly moving parts. These and other objects of this invention will be in part discussed in, and in part apparent from, the following more detailed disclosure.

The present invention can be understood more thoroughly by reference to the accompanying drawings, in which like reference numerals refer to corresponding elements, and in which.

Figure 4:
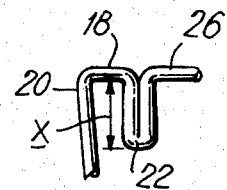
FIGS. 4 and 5 are elevations and show modifications of a portion of the jig of FIG. 1.
Figure 5:
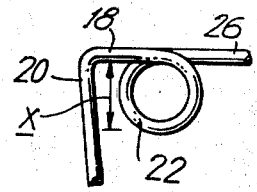

Broadly, a jig 10 according to this invention has an open loop section 12 that is adapted to extend over and embrace an edge 14 of one side wall 16 of an electrical outlet box 15 (partially shown in the drawings). The open loop 12 of the jig 10 is pressed over the wall edge 16 until the closed end 18 of the loop is uniformly against the edge 14. The sides 20,22 of the open loop 12 press against the sides of the wall 16 and firmly hold the box 15. The loop 12 fits over the wall edge 14 an amount X equal to the distance the outlet box 15 is to project out from the face 24b of a building member 24 such as a stud or joist, i.e., the thickness of the interior wall or ceiling construction to be placed on the building member. The sides 22 of the open loop section can be formed in any convenient manner, as shown in FIGS. 4 and 5, so that they extend down from the closed end 18 the distance X and are spaced from side walls 20 an amount to receive box edge 14 tightly.

Extending from one side 22 of the open loop section 12 is an alignment arm 26. The plane of the arm is substantially parallel to the plane of the closed end 18 of the loop 12. To align a box 15 on a building member, the box is placed against one side 24a of the member 24 and the alignment arm 26 of the jig is pushed flush against the outer face 24b of the member. Thus the periphery 14,14a of the open end of the box uniformly projects the desired distance X beyond the stud or joist, and the box is accurately and positively aligned for mounting.

To hold an aligned box 15 against a building member 24 during mounting, a leg member 28 extends from adjacent the arm 26 at an end thereof. The leg member 28 serves to apply pressure against the side 24c of the stud or joist opposite the side wall 16 of the box 15, and thus, in effect, to clamp the box 15 and jig 10 to the stud or joist. Mounted in that fashion, the outlet box can be fastened to a building member without having to hold the box by hand.

For each of placing the open loop section 12 over the side wall edge 14 of the box 15, a tab section 30 optionally extends from the side wall 20 of the loop 12 opposite the arm 26. The tab section 30 also serves to prevent any tendency of the box 15 to rotate, in the loop 12, away from the building member 24, and thus is a desirable feature of the instant jigs.

Figure 1:
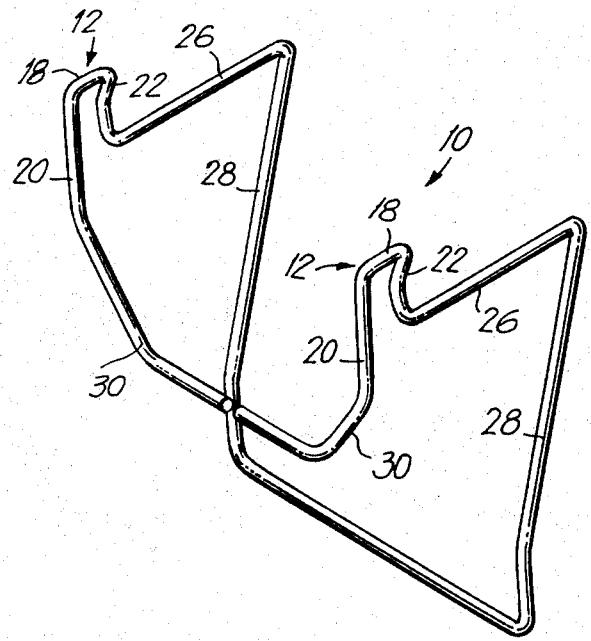
FIG. 1 is a perspective and shows an embodiment of an electrical outlet box mounting jig according to this invention.
Figure 2:
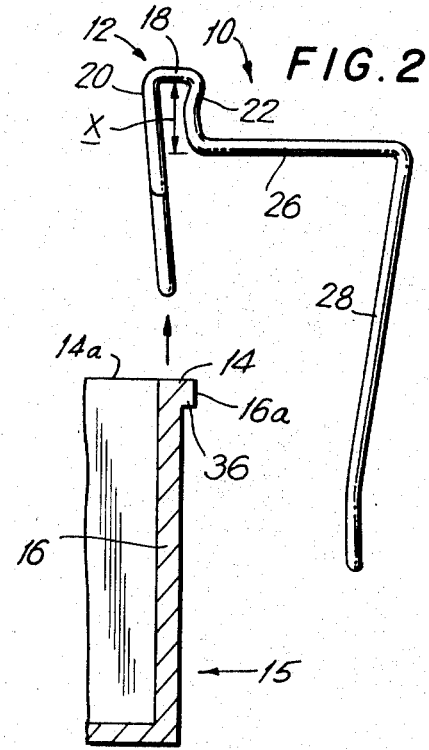
FIG. 2 is a partial section and shows the jig of FIG. 1 and its relation to an outlet box.
Figure 3:
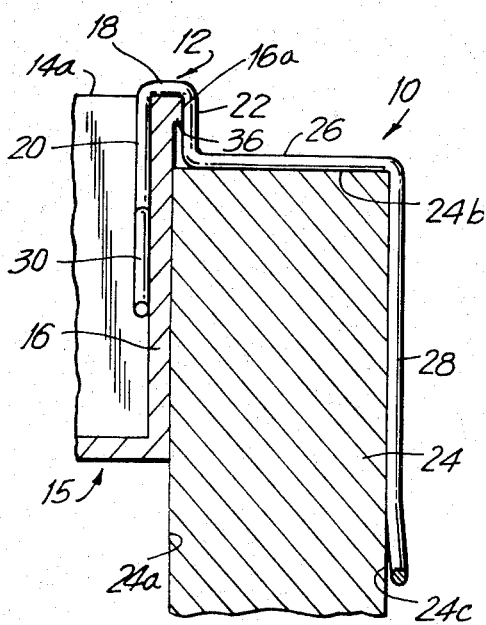
FIG. 3 is a partial section and shows an outlet box mounted and aligned on a building member by the jig of FIG. 1.

In the embodiment illustrated in FIGS. 1, 2 and 3, the leg member 28 is an integral part of the open loop section 12 and the alignment arm 26. That is, the jig 10 is of unitary construction with one or more leg members 28 extending from the ends of the alignment arm or arms 26.

Figure 8:
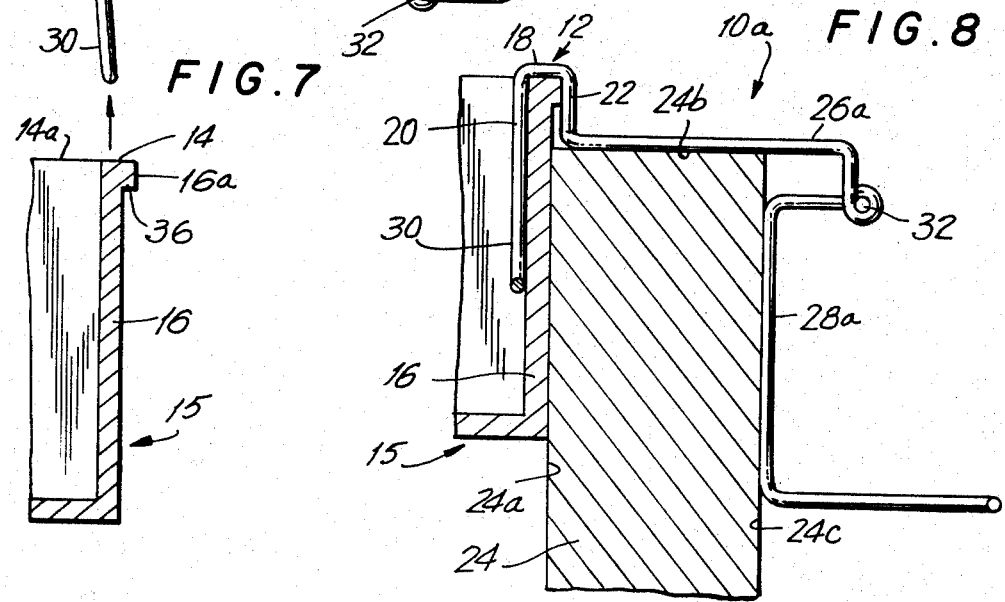
FIG. 8 is a partial section and shows an outlet box mounted and aligned on a building member by the jig of FIG. 6.
Figure 11:
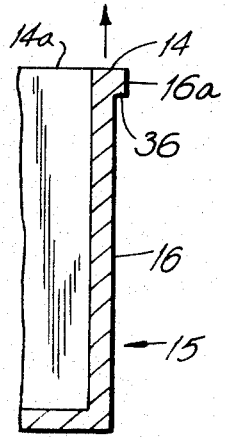
FIG. 11 is a partial section and shows an outlet box mounted and aligned on a building member by the jig of FIG. 9.
Figure 11:
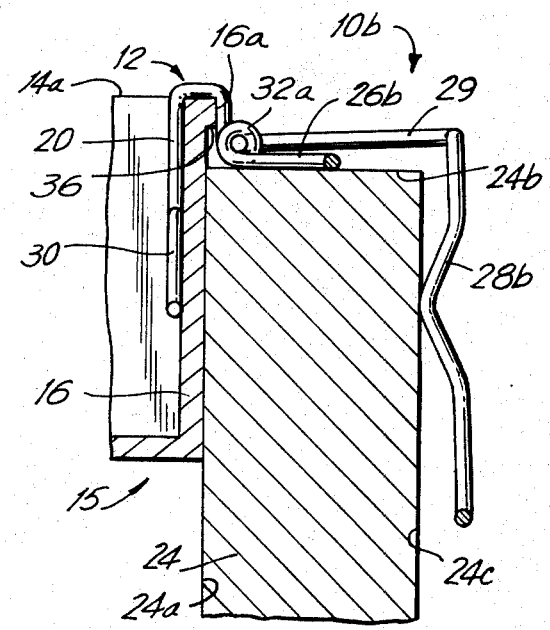

FIGS. 3, 8 and 11 illustrate the profile of a jig 10, on a box and a building member, in what can be called a distended holding condition. One end of the side wall 22 of the open loop 12 tends to close in toward the other side wall 20. Inasmuch as the jig 10 is made of a strip of a resiliently flexible material, for example, a wire or rod of a spring steel or a synthetic plastic having similar properties, the side walls 20,22 of the loop can be spread apart to receive the edge 14 of the box wall 16 and, in that operative condition, exert a pressure against the box wall to hold the box 15 firmly. Similarly, the leg member 28 is substantially in a plane somewhat at less than a right angle to the alignment arm 26, and tends to close toward the loop 12. Thus it can be spread outwardly for positioning on a stud or joist 24 against which it exerts a pressure to hold the jig 10 and the box 15 firmly until the box is fastened. Thereafter the jig is quickly and easily removed by grasping the loop 12 and pulling the jig off both the stud or joist and the box.

Figure 6:
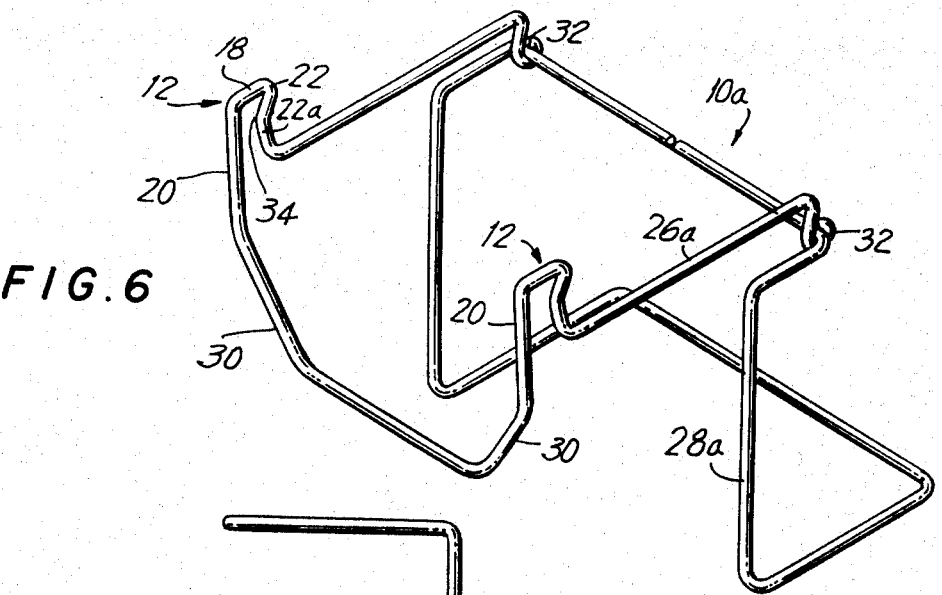
FIG. 6 is a perspective and shows another embodiment of an electrical outlet box mounting jig according to this invention.
Figure 7:
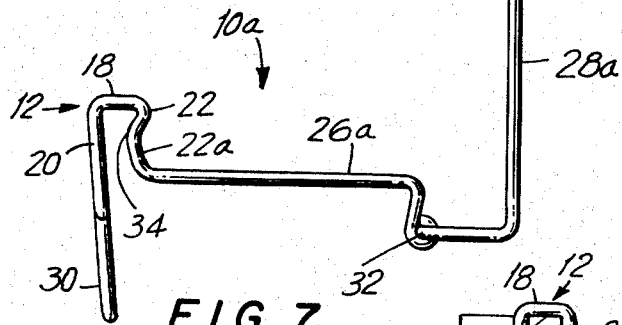
FIG. 7 is a partial section and shows the jig of FIG. 6 and its relation to an outlet box.
Figure 9:
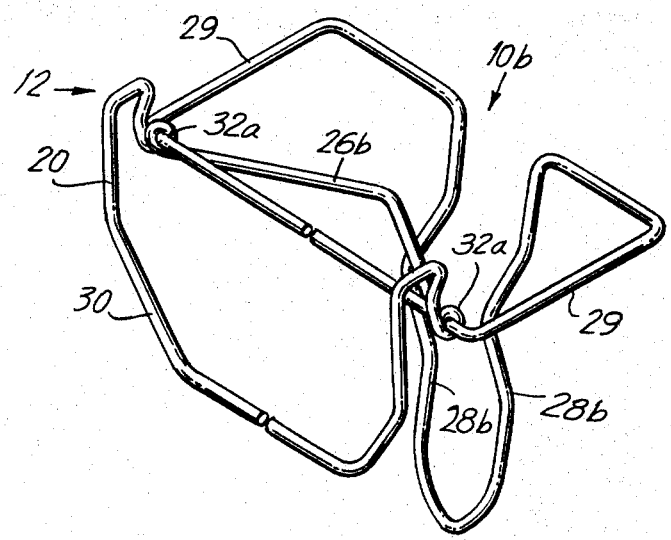
FIG. 9 is a perspective and shows another embodiment of an electrical outlet box mounting jig according to this invention.
Figure 10:
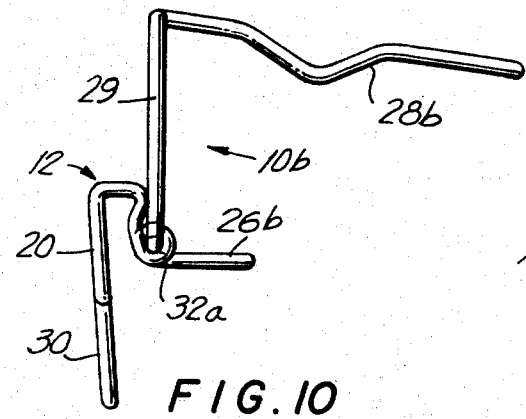
FIG. 10 is a partial section and shows the jig of FIG. 9 and its relation to an outlet box.

FIGS. 6 through 11 show other forms of the instant jigs 10a,10b in which the leg member 28,28b is pivotally mounted so that it can be swung into holding position against face 24c of the building member 24 after the jig and the box held thereby are aligned against faces 24a and 24b. In the embodiment of FIGS. 6, 7 and 8, the leg member 28a is pivotally mounted by any convenient means 32 adjacent the end of alignment arm 26a opposite the open loop section 12. In the embodiment of FIGS. 9, 10 and 11, the leg member 28b is similarly mounted from an extension 29 by pivot means 32a adjacent the end of alignment arm 26b attached to the open loop section 12. It will be apparent that the alignment arm 26b and the leg extension 29 can be a single piece, the pivoted end of the extension serving to align the jig 10b and box 15 against the face 24b of the building member 24. The pivotal mounting of the leg member 28a, 28b in each embodiment of the jig 10a,10b is located in a manner such that, in the holding position shown in FIGS. 8 and 11, the leg member is in a stressed or distended condition locked and bearing against the building member 24. The leg members 28a,28b as previously mentioned, are of a flexibly resilient strip or rod material, preferably spring steel or the like, so that in the distended condition of the holding position the leg members exert a force against the building member 24 to hold the jig 10a,10b and box 15 firmly in place. After the box 15 is fastened to the stud or joist, the jig 10a, 10b is quickly and easily removed by grasping the loop 12 and pulling the jig off both the box and the building member, with or without first swinging the leg member 28a,28b away from the stud or joist.

A feature of a preferred embodiment of the invention also is illustrated in the drawings, e.g., FIG. 7. The side wall 22 of the open loop section 12 attached to the arm section 26 and adapted to bear against the exterior face 16a of the wall of an outlet box, has at the end adjacent the arm 26 a portion 22a turned away from the opposite wall 20 of the loop. The line of the turn, or bend 34, in the wall corresponds to a lip 36 around the periphery 14,14a of the opening of many outlet boxes. The lip 36 reinforces the opening, especially of boxes made of relatively brittle material, such as Bakelite. As the loop 12 is passed over the edge 14 of the box 15, and the line of the turn 34 in the side wall 22 passes beyond the lip 36, the box tends to snap into place in the loop. The snapping movement usually is accompanied by a distinct sound, often a musical sound if the jig is made of a metal such as steel. The snap movement and the sound signal positively that the box 15 is firmly and properly mounted in the jig 10.

It is of course to be understood that numerous changes can be made in the design and structure of the jigs of this invention without departing from the scope of the invention as disclosed herein before and as defined in the following claims.

I claim:

1. A jig for mounting electrical outlet boxes which comprises: an open loop section having a closed end, a first side wall extending from one side of said closed end, a second side wall extending from the opposite side of said closed end, said open loop being formed of a thin elongated flexibly resilient material and adapted to fit over an edge of and to bear firmly against a side wall of an electrical outlet box to hold said box in said jig; an alignment arm extending laterally outward from one of said side walls of said loop section and being adapted at least in part to bear against the face of a building member to which said outlet box is to be fastened, said open loop section and said alignment arm being a single piece of said flexibly resilient material bent to form said section and arm; and a leg member pivotally secured adjacent an end of said alignment arm and swingable to a holding position extending in the direction of the open end of said open loop section, said leg member being formed of a thin elongated flexibly resilient material and adapted to bear in said holding position firmly against said building member on the side thereof opposite an outlet box mounted in said jig and to hold said jig and said box onto said building member.

2. A jig for mounting electrical outlet boxes according to claim 1 wherein said flexibly resilient material is a metal.

3. A jig for mounting electrical outlet boxes according to claim 2 wherein said flexibly resilient material is steel.

4. A jig for mounting electrical outlet boxes according to claim 1 wherein said second side wall of said open loop section extends from the closed end thereof an amount substantially equal to a predetermined distance said outlet box is to project out from said building member, and said alignment arm extends from adjacent an end of said second side wall.

5. A jig for mounting electrical outlet boxes according to claim 1 wherein said first and second side walls of said open loop section, in an undistended condition, are closer together at the open end of said loop than adjacent said closed end thereof.

6. A jig for mounting electrical outlet boxes according to claim 1 wherein a first portion of the side wall of said open loop section from which said alignment arm extends is, in an undistended condition, at less than a right angle to said closed end of said loop, and a second portion of said side wall is at an angle to said first portion away from the other of said side walls.

7. A jig for mounting electrical outlet boxes according to claim 1 which further comprises a tab section extending from the side wall of said open loop section opposite said alignment arm substantially in the plane of said side wall.

8. A jig for mounting electrical outlet boxes according to claim 1 wherein said leg member is pivotally secured adjacent the end of said alignment arm opposite said open loop section.

9. A jig for mounting electrical outlet boxes according to claim 1 wherein said leg member is pivotally secured adjacent the end of said alignment arm attached to said open loop section.

* * * * *